United States Patent
Rhee et al.

(10) Patent No.: US 8,509,064 B2
(45) Date of Patent: Aug. 13, 2013

(54) WIRELESS MESH NETWORK SYSTEM, VIRTUAL NODE GENERATING METHOD, THEREOF, UNICAST PACKET ROUTING METHOD, AND SCHEDULING METHOD THEREOF

(75) Inventors: June Koo Rhee, Daejeon (KR); Sangsu Jung, Daejeon (KR); Jihoon Sung, Daejeon (KR); Doojung Lee, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 402 days.

(21) Appl. No.: 12/849,486

(22) Filed: Aug. 3, 2010

(65) Prior Publication Data

US 2011/0103322 A1 May 5, 2011

(30) Foreign Application Priority Data

Oct. 29, 2009 (KR) .................. 10-2009-0103553

(51) Int. Cl.
*G01R 31/08* (2006.01)
(52) U.S. Cl.
USPC .......................................................... 370/229
(58) Field of Classification Search
USPC .................................................. 370/229–240
See application file for complete search history.

(56) References Cited

U.S. PATENT DOCUMENTS

| | | | |
|---|---|---|---|
| 8,014,329 B2* | 9/2011 | Gong ............................. | 370/311 |
| 8,149,715 B1* | 4/2012 | Goel et al. .................... | 370/238 |
| 8,311,063 B2* | 11/2012 | van Greunen et al. ........ | 370/503 |
| 2006/0056370 A1* | 3/2006 | Hancock et al. ............... | 370/338 |
| 2009/0010190 A1* | 1/2009 | Gong ............................. | 370/311 |
| 2009/0069642 A1* | 3/2009 | Gao et al. ...................... | 600/300 |
| 2011/0069686 A1* | 3/2011 | Raman .......................... | 370/338 |

FOREIGN PATENT DOCUMENTS

| | | |
|---|---|---|
| KR | 1020060026864 | 3/2006 |
| KR | 10-2009-0070973 | 1/2009 |
| KR | 1020090054011 | 5/2009 |
| KR | 10 2009 010 4615 A | 10/2009 |

OTHER PUBLICATIONS

Jung et al., Distributed Potential Field Based Routing and Autonomous Load Balancing for Wireless Mesh Networks, IEEE Communications Letters, vol. 13, No. 6, Jun. 2009.

* cited by examiner

*Primary Examiner* — Fan Ng
(74) *Attorney, Agent, or Firm* — Gifford, Krass, Sprinkle, Anderson & Citkowski, P.C.

(57) ABSTRACT

A wireless mesh network system generates at least one virtual node within a transmission area of a specific mesh node when no mesh nodes exist in two or three continuous quadrants within the transmission area with reference to the specific mesh node. Also, the system performs routing by combining uplink and downlink routing methods so as to support unicast between the mesh nodes in a domain. Further, a channel access order of the mesh nodes is determined based on the potential values allocated to the mesh nodes forming the wireless mesh network according to the field theory. In this instance, the channel access order can be established by a central control method by a central processor for controlling the wireless mesh network or a distributed control method using contention per mesh node.

13 Claims, 13 Drawing Sheets

◆ : Node
Radius of circle: transmission area of node

FIG. 2

◆ : Node
Radius of circle: transmission area of node

| Priority | 0 | 1 | 2 | 3 | 4 | 5 | 6 | 7 |
|---|---|---|---|---|---|---|---|---|
| Force | <1/8 | <2/8 | <3/8 | <4/8 | <5/8 | <6/8 | <7/8 | ≥7/8 |
| Standby for transmission(μs) | 7 | 6 | 6 | 6 | 3 | 3 | 3 | 2 |
| CWmax(μs) | 10 | 9 | 8 | 7 | 5 | 4 | 3 | 3 |
| CWmin(μs) | 5 | 5 | 5 | 5 | 4 | 3 | 2 | 1 |

201 — Priority
203 — Force
205 — Standby for transmission(μs)
207 — CWmax(μs)
209 — CWmin(μs)

FIG. 13

WIRELESS MESH NETWORK SYSTEM, VIRTUAL NODE GENERATING METHOD, THEREOF, UNICAST PACKET ROUTING METHOD, AND SCHEDULING METHOD THEREOF

CROSS-REFERENCE TO RELATED APPLICATION

This application claims priority to and the benefit of Korean Patent Application No. 10-2009-0103553 filed in the Korean Intellectual Property Office on Oct. 29, 2009, the entire content of which is incorporated herein by reference.

BACKGROUND OF THE INVENTION (a) Field of the Invention

The present invention relates to a wireless mesh network system, a virtual node generating method of the wireless mesh network system, a unicast packet routing method, and a scheduling method. Particularly, the present invention relates to a system and method for stably generating a field, including unicast in a subset, and performing appropriate scheduling so as to improve performance of an electrostatic field model based potential routing scheme in a wireless mesh network including a plurality of nodes.

(b) Description of the Related Art

In a conventional potential routing scheme, potential values for a plurality of mesh nodes are calculated, and potential values for a plurality of gateway nodes are assigned. When transmitting a data packet at a specific node, the scheme utilizes potential values and position information on 1-hop neighboring nodes, and sets a routing path according to the information. The scheme minimizes a maintenance cost of the network path and handover delay of a moving mesh node by transmitting the data packet through a single path or multi-paths according to the routing path.

The conventional potential routing scheme is designed in consideration of communication between the wireless mesh node and the wireless mesh gateway. It further cannot solve the problem of data transmission failure at a topology including vacant areas and linear topology.

In addition, the IEEE 802.11 CSMA/CA (Carrier Sense Multiple Access with Collision Avoidance) and back-pressure scheduling has been proposed as existing scheduling schemes for the wireless environment.

The IEEE 802.11 CSMA/CA defines a method to occupy a shared wireless resource by contention. The back-pressure scheduling method is known to achieve optimization of the throughput in the infinite buffer and unicast environment, and it determines the channel occupancy order by assigning priorities to links according to queue differences among respective nodes.

However, the existing scheduling schemes are not specified to the wireless mesh environment. That is, the problem of inefficiently providing a channel access right to a specific flow exists in the IEEE 802.11 CSMA/CA based wireless mesh network.

Also, a bottleneck area near a gateway is not considered in the conventional back-pressure scheduling based wireless mesh network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for generating a virtual node to set a boundary condition according to a form and change of topology, unicasting in a subnet, and performing scheduling according to potential information, having advantages of improving performance of a potential routing method based on an electrostatic field model in a wireless mesh network.

An exemplary embodiment of the present invention provides a wireless mesh network system using electrostatic field model based potential routing scheme comprising: a plurality of mesh nodes for calculating a potential value by using at least one virtual node generated when a predefined boundary node condition is satisfied, and routing a packet according to a predetermined packet transmission order by using the potential value and a plurality of gateway nodes, located in wireless mesh network, for functioning as gateways to provide an Internet connection to the plurality of mesh nodes.

Another embodiment of the present invention provides a method for generating a virtual node, comprising: a mesh node checking a disposed state of neighboring nodes, the mesh node as a node for calculating a potential value at a predefined specific time; determining whether the mesh node is a boundary node based on the disposed state; and generating at least one virtual node when the mesh node is determined to be the boundary node.

Yet another embodiment of the present invention provides a method for a plurality of mesh nodes to route a unicast packet in a wireless mesh network, comprising: determining whether a network prefix of a destination of a received packet corresponds to network prefixes of the plurality of mesh nodes; when the network prefixes are different, routing the unicast packet to a default gateway node; and when the network prefixes are the same, routing the unicast packet by referring to a source address-based routing table including a downlink routing path determined by a uplink routing path.

Yet another embodiment of the present invention provides a method for a plurality of mesh nodes to schedule a packet in a wireless mesh network, comprising: calculating potential values of the plurality of mesh nodes and a potential values of first-hop neighboring nodes; and scheduling a packet transmission order based on the calculated potential values.

According to the embodiments of the present invention, the boundary node condition makes the potential field formed even within the corresponding network so that the field theory based routing method may flexibly be used in any network topology, and it prevents performance deterioration caused by topology form and change of the wireless mesh network.

Also, distributed boundary node allocation is possible by generating the virtual node. Further, a few difficult situations can be quickly overcome such as field formation when a calculating mesh node and its neighboring nodes are in a straight line or network separation.

Further, potential routing specific to communication between the mesh node and the gateway can include unicast within the subnet through the unicast method.

In addition, since scheduling is performed by the potential value, the users can receive a better Internet service with the efficiently allocated resource than the back-pressure scheduling and the IEEE 802.11 CSMA/CA.

Also, the present invention can be used as application for supporting various user demands by using the uplink and downlink routing schemes and supporting the unicast service between the subnets and in the subnet.

In addition, the throughput of the entire network is maximized and user's efficiency is also increased by solving the problem in which the channel access right is inefficiently provided to a specific flow in the IEEE 802.11 CSMA/CA based wireless mesh network and the problem in which the bottleneck area that is near the gateway is not considered in the existing back-pressure scheduling based wireless mesh network.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A wireless mesh network system, a virtual node generating method of the wireless mesh network system, a unicast packet routing method, and a scheduling method according to exemplary embodiments of the present invention will now be described in detail with reference to accompanying drawings.

Figure 1:
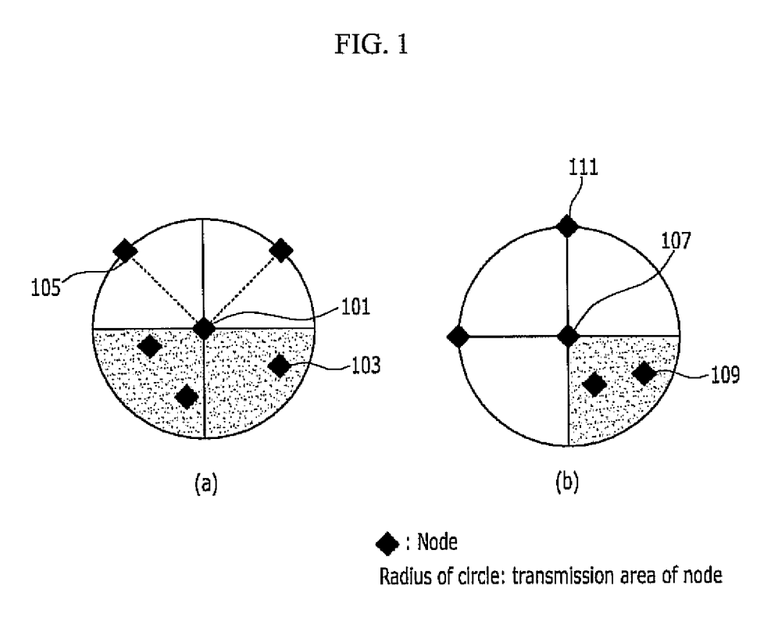
FIG. 1 shows a node configuration for indicating a boundary node condition according to an exemplary embodiment of the present invention.

FIG. 1 shows a node configuration for indicating a boundary node condition according to an exemplary embodiment of the present invention.

Here, the boundary node condition represents the term of boundary condition that is applied to the boundary to satisfy a specific phenomenon of a random system to the network system.

In detail, the boundary condition includes: the Dirichlet boundary condition having a constant value on the boundary, the Neumann boundary condition having a constant vertical derivative value on the boundary, and the Cauchy boundary condition having a constant value and a vertical derivative value on the boundary.

The Dirichlet boundary condition is satisfied when such concept is applied to the network system so that the boundary nodes existing on the boundary of the network topology have a constant potential value, the Neumann boundary condition is satisfied when they are controlled to have a variation of the constant potential value, and the Cauchy boundary condition is satisfied when they are controlled to have a constant potential value and variation of the constant potential value, which become the boundary node conditions of the network system.

Returning to FIG. 1, nodes 101 and 107 (node A and node B) in the center of the circle in (a) and (b) of FIG. 1 represent nodes for calculating a potential value at a specific time.

Also, nodes 103 and 109 in the shaded area are neighboring nodes of the node A 101 and the node B 107.

Further, nodes 105 and 111 existing on the boundary of the circle in the white area are virtual nodes.

Referring to FIG. 1 (a), the node A 101 determines whether neighboring nodes exist within the transmission range. In this instance, the node A determines that neighboring nodes 103 exist in the third quadrant and the fourth quadrant (i.e., the shaded area). The node A 101 determines that there is no other node in the near two consecutive quadrants, that is, the first quadrant and the second quadrant. In this case, the node A 101 determines that the node A 101 is a boundary node. The node A 101 disposes at least one virtual node 105 having a specific potential value within the transmission area. No nodes exist in any of the transmission areas. Further, the node A 101 controls the disposed virtual node to have a potential value of a proper random constant or a value that is generated by interpolating a potential value of the node A and a proper random constant so that it may function as a boundary node for any kind of topology.

Referring to FIG. 1 (b), the node B 107 determines whether neighboring nodes exist within the transmission range. In this instance, the node B determines that neighboring nodes 109 exist in the fourth quadrant (i.e., the dark area). The node B 107 determines that no node exists in the three consecutive quadrants near the node B 107, that is, the first quadrant, the second quadrant, and the third quadrant. In this case, the node B 107 determines that the node B 107 is a boundary node, and generates virtual nodes 111.

Accordingly, the random node is determined to be a boundary node when no neighboring nodes exist in the two or three consecutive quadrants. In this instance, the condition determined to be a boundary node is expressed as follows.

First, N is a set of all nodes existing in a given network. $Q_{n,k}$ is the k-th quadrant in the transmission area of the node n. Here, $k \in \{1,2,3,4\}$, and each quadrant includes an axis that meets in the counterclockwise direction. The a mod b is a remainder when a is divided by b, and { } is an empty set.

In this instance, in the case of $n \in N$ and $i = q \mod 4$, when no neighboring node exists in the three consecutive quadrants of the node n, it is expressed as in Equation 1.

$$Q_{n,\{(i)mod+4\}+1}, Q_{n,\{(i+1)mod+4\}+1}, Q_{n,\{(i+2)mod+4\}+1} = \{\ \} \quad \text{(Equation 1)}$$

Further, when no neighboring nodes exist in the two consecutive quadrants of the node n, it is expressed in Equation 2.

$$Q_{n,\{(i)mod+4\}+1}, Q_{n,\{(i+1)mod+4\}+1} = \{\ \} \quad \text{(Equation 2)}$$

Figure 2:
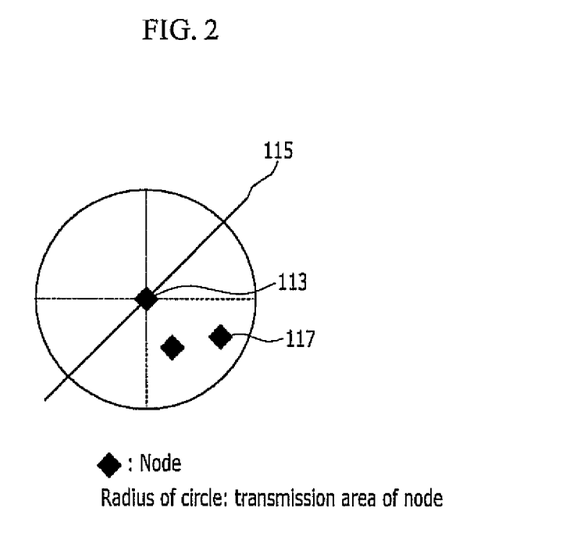
FIG. 2 shows a node configuration for showing a boundary node condition according to another exemplary embodiment of the present invention.

FIG. 2 shows a node configuration for showing a boundary node condition according to another exemplary embodiment of the present invention.

Referring to FIG. 2, the node 113 for calculating the potential value at a specific time uses a boundary line 115 passing through the node 113 to divide the entire area of the circle into two divided sides. The node 113 determines that the node 113 is a boundary node when no neighboring node exists in a divided side with respect to the boundary line 115.

Figure 3:
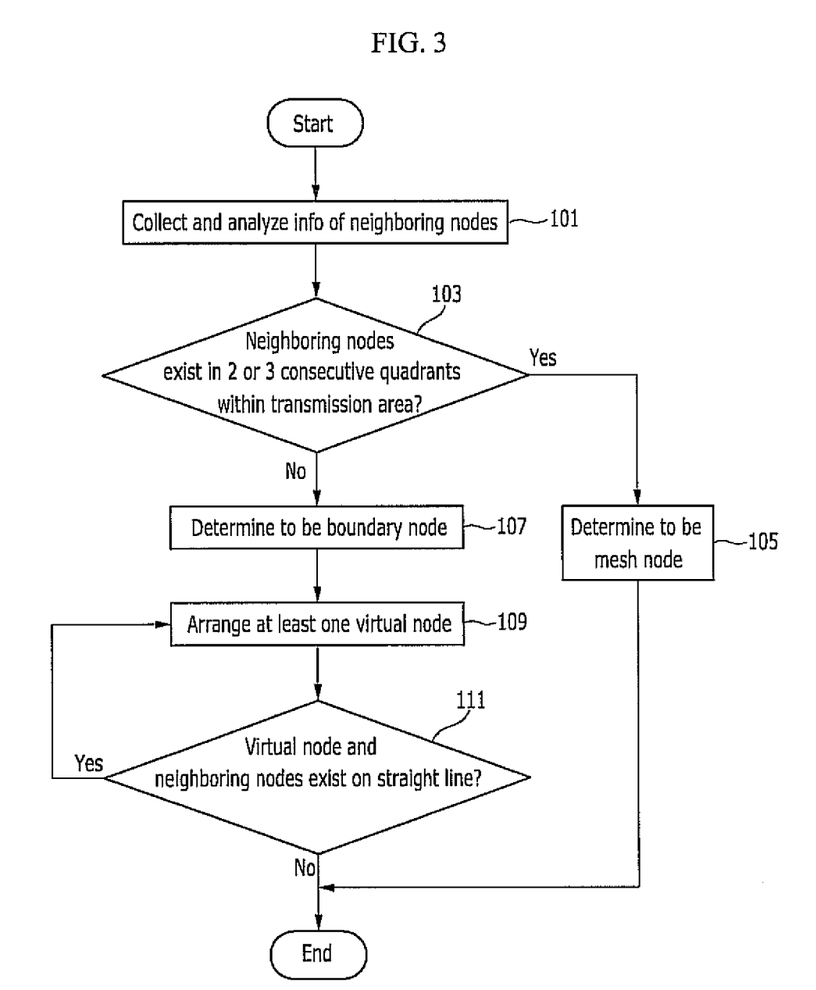
FIG. 3 shows a flowchart of a process for determining a boundary node according to an exemplary embodiment of the present invention.

FIG. 3 shows a flowchart of a process for determining a boundary node according to an exemplary embodiment of the present invention.

Referring to FIG. 3, a node for calculating the potential value at a specific time, collects information on the neighboring nodes and analyzes it (S101). In this instance, the nodes forming the wireless mesh network can have position information and potential values of the neighboring nodes within the transmission area through periodic exchange of information.

The nodes periodically calculate the potential values through periodic transmitting/receiving information to/from the neighboring nodes.

Here, the potential value is found by applying the subsequent equation induced from the finite element method and the local equilibrium method based on Poisson's equation.

$$\phi(n) = \frac{\sum_{k=0}^{m-1} \left[ \frac{[\phi(nbr_{n,k+1})\vec{r}_{n,k} - \phi(nbr_{n,k})\vec{r}_{n,k+1}] \cdot (\vec{r}_{n,k} - \vec{r}_{n,k+1})}{A_k} + \eta q(n) \right]}{\sum_{k=0}^{m-1} \frac{\|\vec{r}_{n,k} - \vec{r}_{n,k+1}\|^2}{A_k}} \quad \text{(Equation 3)}$$

Here, $\phi(n)$ is a potential of the node n, and q(n) is a length of a queue to be transmitted. $\phi(nbr_{n,k+1})$, $\phi nbr_{n,k}$) are potential values of the (k+1)-th and (k)-th first-hop neighboring nodes $nbr_n$. $\vec{r}_n$ is distance information of the first-hop neighboring nodes $nbr_n$ and the node n, and A is an area formed by the nodes.

The random node determines whether the random node is a boundary node according to a disposed state of the neighboring nodes based on the information collected and analyzed in S101. That is, the random node determines whether neighboring nodes exist in the two or three consecutive quadrants within the transmission area (S103).

When the neighboring nodes exist, the random node is determined to be a mesh node (S105). However, when no neighboring node exists, the random node is determined to be a boundary node (S107).

When determined to be a boundary node, the random node generates a virtual node in the case of calculating the potential value in the transmission area where no nodes exist. At least one virtual node is disposed (S109).

Whether the neighboring nodes including the disposed virtual node and the random node are on the straight line is determined (S111). When they are on the straight line, S109 is repeated until they no longer exist on the straight line.

Accordingly, the node classified as the boundary node can function as a boundary node for any topology by disposing at least one virtual node having a potential value of a proper random constant within the transmission area or a potential value that is generated by interpolating a potential value of the node classified as the boundary node and a proper random constant.

The virtual node must not be disposed on the straight line together with the existing neighboring nodes because the nodes for calculating the potential value sequentially calculate a potential value per element in the triangular form with the neighboring nodes within the transmission area and finally get the potential value. When the node fails to form a triangle with the neighboring nodes, the potential value cannot be calculated by the same method, it becomes an algorithm that cannot be extended, and the potential value cannot be finally calculated.

Figure 4:
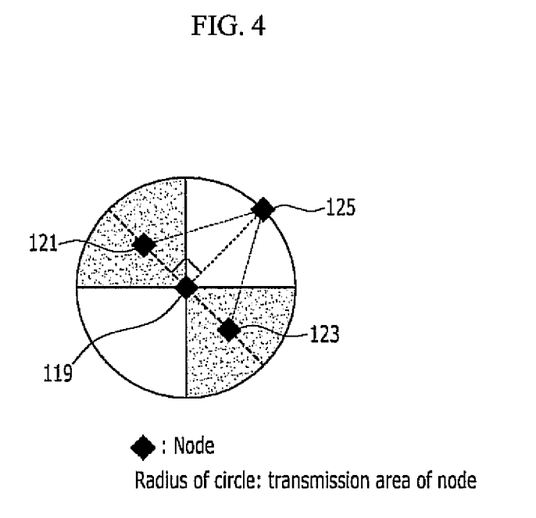
FIG. 4 shows a node configuration when the nodes are on a straight line according to an exemplary embodiment of the present invention.
Figure 5:
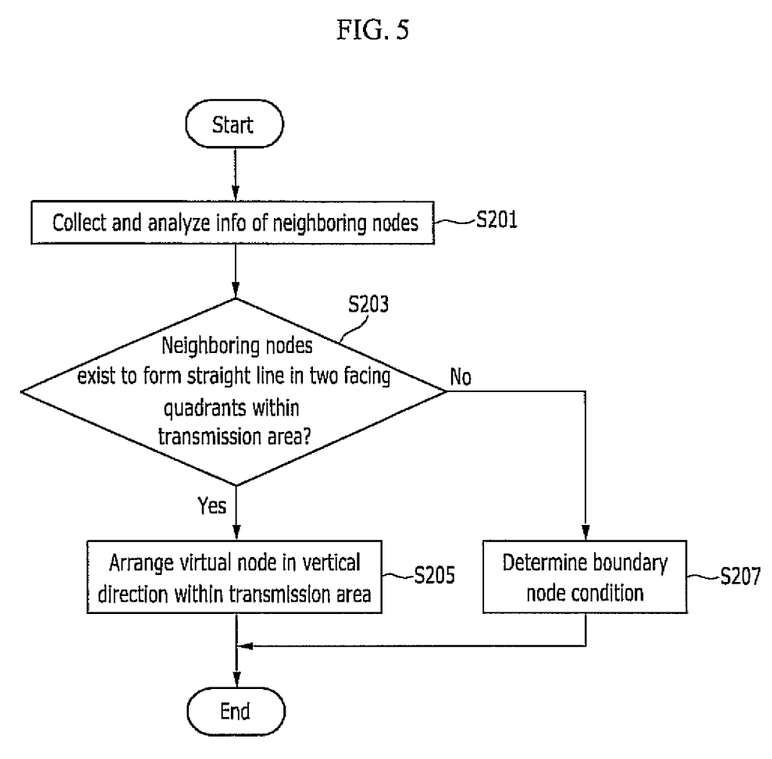
FIG. 5 shows a flowchart of a virtual node deployment method according to another exemplary embodiment of the present invention.

FIG. 4 shows a node configuration when all nodes in a transmission range are on a straight line according to an exemplary embodiment of the present invention, and FIG. 5 shows a flowchart of a virtual node deployment method according to another exemplary embodiment of the present invention.

Referring to FIG. 4, the random node, that is, the node 119 for calculating the potential value at a specific time, has two neighboring nodes 121 and 123 in the second quadrant and the fourth quadrant, respectively.

The random node 119 and the neighboring nodes 121 and 123 exist on the straight line, the random node 119 cannot calculate the potential value, and hence the method shown in FIG. 5 is used.

Referring to FIG. 5, the random node 119 collects and analyzes information on the neighboring nodes, and periodically calculates the potential value based on the information (S201).

In this instance, it is determined whether the neighboring nodes exist on the straight line in the two facing divided sides within the transmission area (S203).

When they exist, a virtual node 125 having a potential value of a proper random constant or a potential value that is generated by interpolating a potential value of a node classified as the boundary node and a proper random constant is disposed in the vertical direction within the transmission area, as shown in FIG. 4 (S205). Then, the random node 119 can calculate the potential value since the nodes in the transmission area form at least a triangle.

When they do not exist, the boundary node condition is determined (S207). That is, the process of FIG. 3 is performed.

Figure 6:
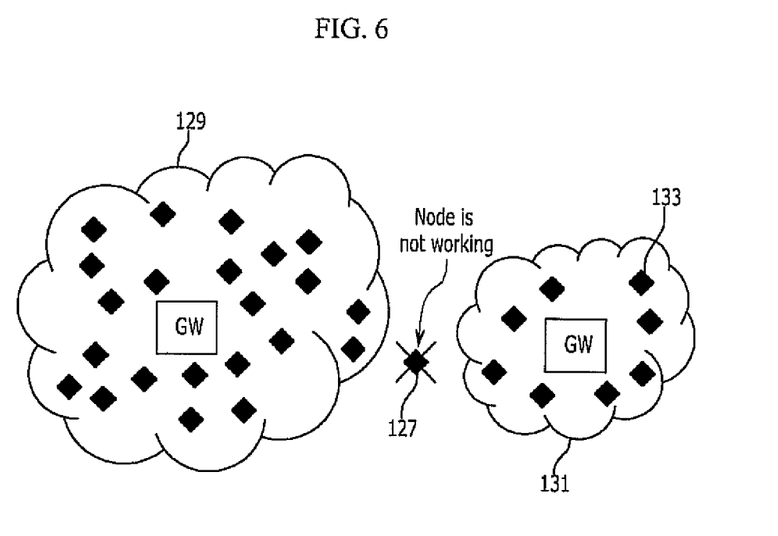
FIG. 6 shows a case in which a virtual node is applied when a network is separated according to an exemplary embodiment of the present invention.

FIG. 6 shows a case in which a virtual node is applied when a network according to an exemplary embodiment of the present invention is divided.

Referring to FIG. 6, a network is divided into two networks 129 and 131 because a specific node 127 for relaying specific areas is in trouble.

When no node is in trouble, the network configured with two gateways (GW) by the potential calculation algorithm forms a potential field. That is, the mesh nodes 133 can be connected to the two gateways.

However, when the node is not working and the network is separated, the nodes 133 in the networks 129 and 131 displayed by the respective gateways cannot access any gateway in the opposite separated network.

In this instance, when the conventional potential calculation algorithm is applied, the mesh nodes near the specific node 127 in trouble do not have a converged potential value and generate a routing stability problem.

In this case, a virtual node having a potential value of a proper random constant or a potential value generated by interpolating a potential value of a node classified as a boundary node and a proper random constant within the given networks 129 and 131 is added to the networks 129 and 131, respectively.

Here, the proper random constant represents a predefined constant obtained by multiple simulations.

The mesh nodes 133 have converged potential values by the virtual node, and the two networks 129 and 131 can respectively form an independent field.

Figure 7:
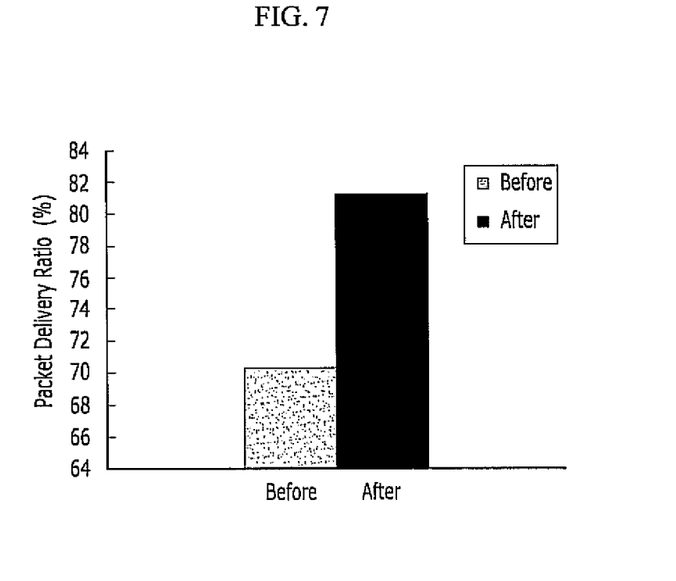
FIG. 7 shows a comparison of packet delivery ratios between a potential routing method using a virtual node according to an exemplary embodiment of the present invention and the conventional potential routing method.
Figure 8:
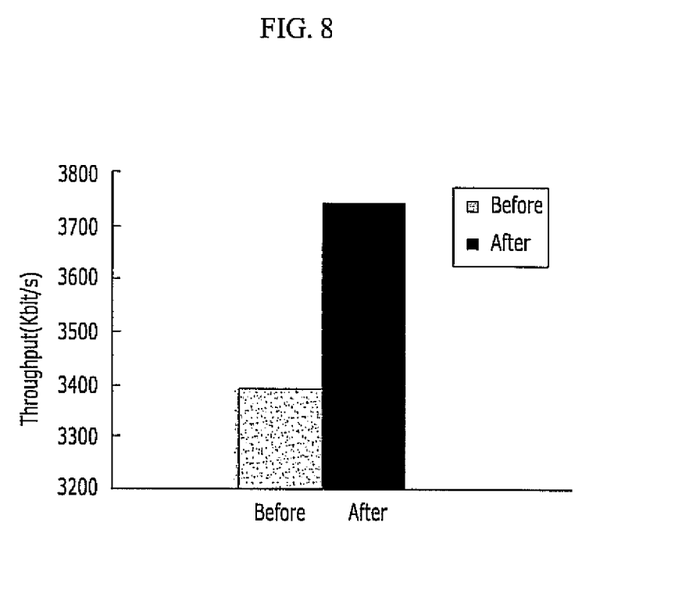
FIG. 8 shows comparison of throughputs, that is, the total amount of successfully delivered packets in the network, between a potential routing method using a virtual node according to an exemplary embodiment of the present invention and the conventional potential routing method.

FIG. 7 shows a comparison of packet delivery ratios between a potential routing method using a virtual node according to an exemplary embodiment of the present invention and the conventional potential routing method, and FIG. 8 shows comparison of throughputs, that is, the total amount of successfully delivered packets in the network.

In this instance, "Before" represents the conventional potential routing method, and "After" indicates a potential routing method according to an exemplary embodiment of the present invention.

Referring to FIG. 7 and FIG. 8, the "After" having disposed the virtual node has outperformed the "Before" in the topology with an irregular node arrangement regarding the packet delivery ratio and throughput.

In this instance, unicast in a subnet is configured with a set of uplink routing and downlink routing. Here, the uplink routing has a traffic characteristic of many-to-one or many-to-few directions, and the downlink routing has the opposite characteristic of the uplink routing. The unicast represents communication between a single transmitter and a single receiver on the network.

Figure 9:
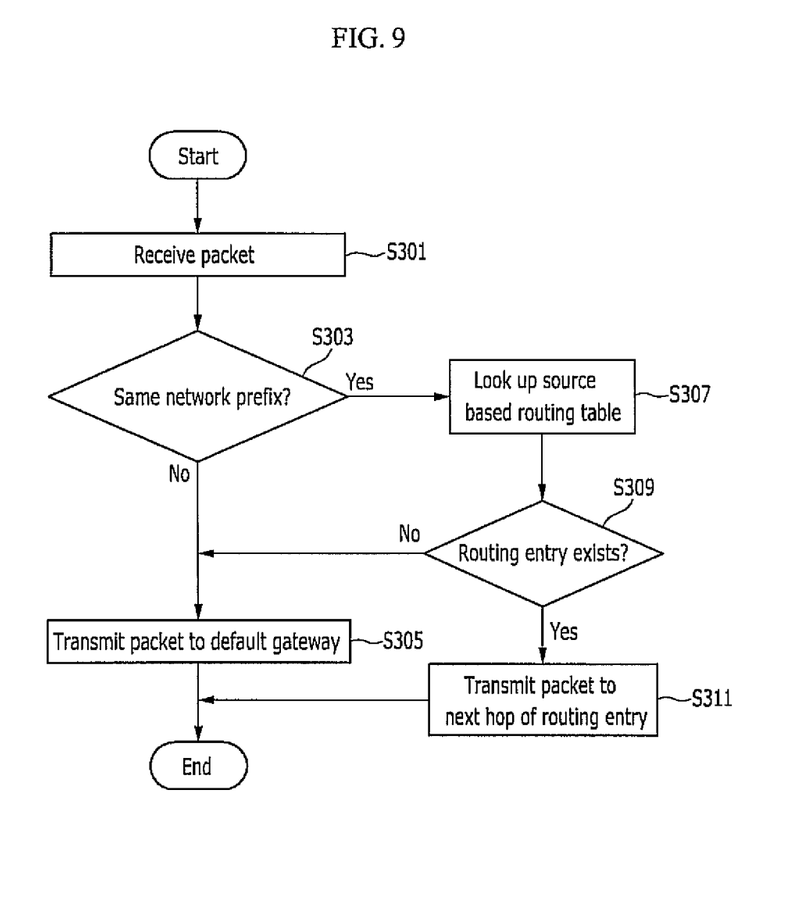
FIG. 9 shows a flowchart of a unicast transmission process according to an exemplary embodiment of the present invention.

FIG. 9 shows a flowchart of a unicast transmission process according to an exemplary embodiment of the present invention.

Referring to FIG. 9, when a random mesh node receives a packet (S301), a network prefix of a destination address determines whether the network prefix of the destination address corresponds to a network prefix of the mesh node (S303). That is, the mesh node distinguishes a unicast packet within the subnet and a unicast packet between subnets by using the network prefix of the destination address.

In this instance, when the network prefixes are not the same, it is determined to be the unicast packet between subnets, is transmitted to the default gateway (S305), and is processed similar to an anycast packet.

Here, the anycast represents communication between a single transmitter and one of multiple receivers of a group. The anycast is designed for efficient communication in the network in which a destination is not predefined.

However, when the network prefixes are the same, it is determined to be a unicast packet within the subnet, and is routed by using the downlink routing.

That is, a source address-based routing table is looked up, and routing is performed by using the lookup information (S307). In this instance, the source address-based routing table is set by a uplink routing path and includes a downlink routing path required for the packet to pass through the network.

The source address-based routing table was conventionally used to transmit the downlink packet, and it is also used to transmit the unicast within the subnet in an exemplary embodiment of the present invention.

In this instance, it is determined whether the routing entry exists (S309). When no routing entry exists, that is, when there is no source address-based routing information for the routing path, the packet is transmitted to the default gateway (S305).

That is, the mesh node forwards the packet in the direction of the gateway by using the uplink routing method until it meets the mesh node having the source address-based routing table having routing entry. When a downlink source address-based routing table is not found at the gateway node, the gateway forwards the packet to another gateway on the same network through a cable network. Since all the packets are transmitted through the gateway, the source address-based routing table for all nodes on the wireless mesh network exist in the downlink routing table of at least one gateway. Therefore, the unicast packet is always transmittable to the destination.

However, when a routing entry exists, the mesh node transmits the packet to the next hop of the routing entry by using the downlink routing scheme (S311).

In the wireless mesh network, a packet transmission order is set based on potential information on the neighboring node and the calculating node. Therefore, the scheduling scheme for a central control method and a distributed method is proposed to provide an efficient network from the viewpoint of the service provider and maximize service quality from the viewpoint of the user by allocating the user's channel access order and usage time so that the wireless mesh network may efficiently use the bandwidth.

In this instance, all nodes (including the mesh node and the boundary node) update the potential values of the nodes to a central processor (not shown) for controlling the wireless mesh network. A central processor determines the channel access order of mode nodes by using the updated potential value, as shown in FIG. 10.

Figure 10:
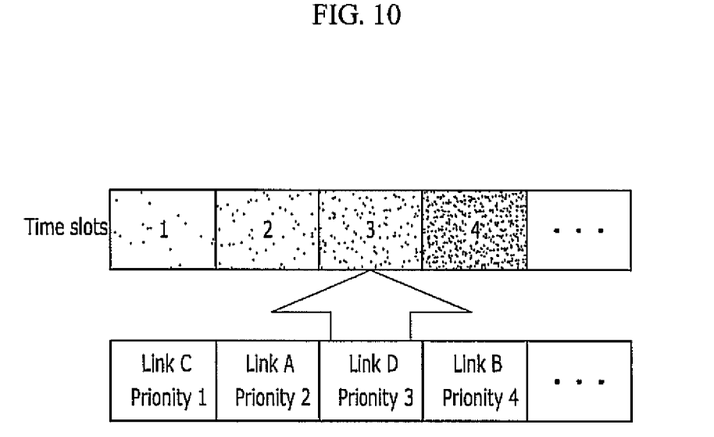
FIG. 10 shows a central control scheduling algorithm according to an exemplary embodiment of the present invention.

FIG. 10 shows a central control scheduling algorithm according to an exemplary embodiment of the present invention.

Referring to FIG. 10, the central processor allocates links A, B, C, and D to which priority is assigned for each time slot.

In this instance, force that is defined by a difference of potential values per link of the transmission path is calculated according to Equation 4.

$$\text{force}(n, nbr_{n,k}) = -[\phi(n) - \phi(nbr_{n,k})] \quad \text{(Equation 4)}$$

That is, the force is defined by the difference between the potential value of the node n and the potential value of the first-hop neighboring node $nbr_n$.

The central processor sets the order to access the channel in the order of the link C, link A, link D, and link B starting from the link C with the greatest force through Equation 4, and notifies the respective nodes of the channel access time. That is, the links starting from the link with the greatest potential difference access the channel.

In this instance, the channel access time of the respective nodes considers an interference range and the transmission time between the links at which no interference will occur during simultaneous transmission can be allocated identically.

Also, the nodes forming the wireless mesh network can perform scheduling with information on the node and the first-hop neighboring nodes. In this instance, Equation 4 is used, and the access times of the respective links are determined by contention method as shown in FIG. 11 and FIG. 12.

Figure 11:
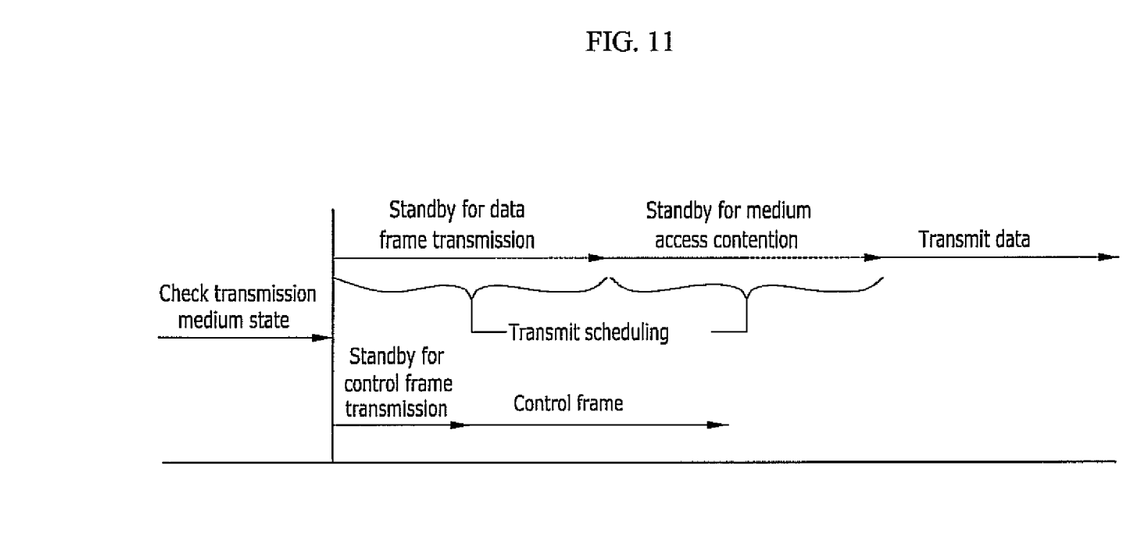
FIG. 11 shows a distributed scheduling algorithm according to an exemplary embodiment of the present invention.
Figure 12:
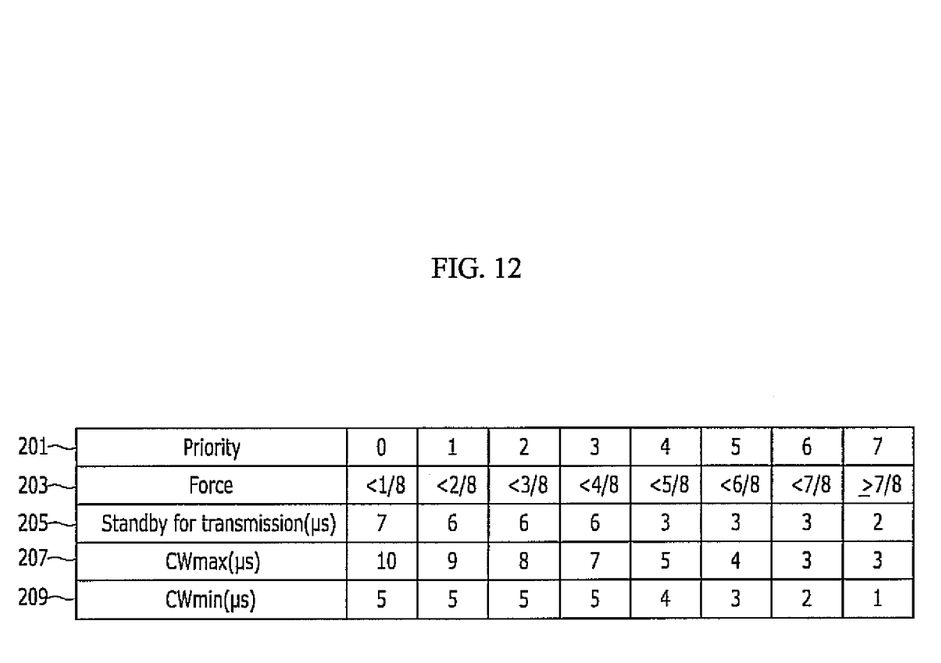
FIG. 12 shows an example for setting parameters for a distribution scheduling algorithm according to an exemplary embodiment of the present invention.

FIG. 11 shows a distributed scheduling algorithm according to an exemplary embodiment of the present invention, and FIG. 12 shows an example for setting parameters for a distributed scheduling algorithm according to an exemplary embodiment of the present invention.

Referring to FIG. 11 and FIG. 12, the maximum contention standby time (CWmax) 207 and the minimum contention standby time (CWmin) 209 indicate contention standby times. The data frame transmission standby of FIG. 11 shows a transmission standby 205 of FIG. 12. The medium access contention standby of FIG. 11 indicates the CWmax 207 and the CWmin 209 of FIG. 12.

Regarding Priority 201 of FIG. 12, the priority is the lowest when Priority 201 has 0, and the priority is the highest when Priority 201 has 7. The standard for determining Priority 201 is the force 203 that is defined by the difference of the potentials. The priority 201 is the lowest when the force 203 is less than ⅛, and it is the highest when the force 203 is greater than ⅞. The transmission standby time 205 and the contention standby times 207 and 209 are set according to the above-defined priority 201.

Accordingly, the access times of the transmission links of the wireless mesh network are determined by contention method. In this instance, the contention scheme is similar to the carrier sense multiple access with collision avoidance (CSMA/CA), however, it does not set the access order through a simple random contention, and it sets different channel access times according to the difference of the links by setting per-degree contention modes based on Equation 4, as shown in FIG. 12. As shown in FIG. 11, when the channel is available after carrier-sensing, the node accesses the channel after having waited for the standby time determined by the potential difference.

Further, when a collision occurs, the channel access time is randomly set with the size of the contention window that is set by the potential difference.

Figure 13:
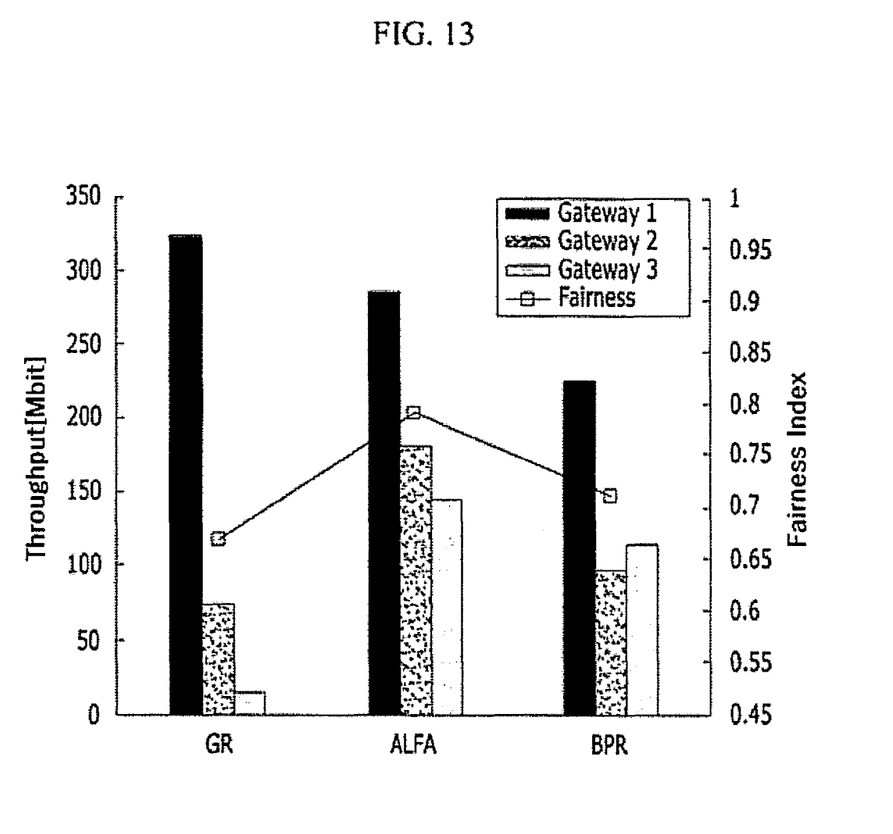
FIG. 13 shows comparison of throughput and fairness between a scheduling algorithm according to an exemplary embodiment of the present invention and the conventional scheduling algorithm.

FIG. 13 shows comparison of throughput and fairness between a scheduling algorithm according to an exemplary embodiment of the present invention and the conventional scheduling algorithm.

In this instance, GR stands for geographic routing, and a geographic information based protocol is a combination of geographic information based routing and back-pressure scheduling.

The ALFA stands for autonomous load balancing field-based anycast routing, it is a routing protocol according to an exemplary embodiment of the present invention, and it is a combination of the conventional potential routing and the scheduling algorithm described with reference to FIG. 10 to FIG. 12.

The BPR stands for back-pressure routing, and the back-pressure algorithm is a combination of back-pressure routing and back-pressure scheduling.

In general, more users can be accepted as the number of gateways in the wireless mesh network is increased, and three gateways (Gateways 1, 2, and 3) are used in FIG. 13.

Referring to FIG. 13, the ALFA that is an algorithm according to an exemplary embodiment of the present invention superbly outperforms the conventional GR algorithm and the BPR algorithm regarding the throughput and fairness.

The above-noted performance is generated because of the autonomous load balancing effect of conventional potential routing and the efficient wireless link usage distributing effect of the scheduling algorithm according to the embodiment of the present invention, that is, the effect in which the more frequent transmission is done as the link is nearer the gateway appropriately distributes the packets of users to the respective gateways in the wireless mesh network.

On the contrary, the protocols based on back-pressure scheduling are designed with no consideration of the location of the gateway, and they may assign higher priority to the link that is unnecessarily selected since scheduling is performed with the queue difference without distinguishing the link that is distant from the gateway and the link that is near the same. Because of this possibility, the wireless resource is consumed to an undesirable place to reduce the throughput at the gateway.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A wireless mesh network system using electrostatic field model based potential routing scheme comprising:
   a plurality of mesh nodes for calculating a potential value by using at least one virtual node generated within a transmission area when a predefined boundary node condition is satisfied, and routing a packet according to a predetermined packet transmission order by using the potential value; and
   a plurality of gateway nodes, located in wireless mesh network, for functioning as gateways to provide an Internet connection to the plurality of mesh nodes,
   wherein, when no neighboring nodes exist in two or three consecutive quadrants within the transmission area, the plurality of mesh nodes determine themselves to be boundary nodes, however if determined as boundary nodes, they generate at least one virtual node within the transmission area.

2. The wireless mesh network system of claim 1, wherein, when neighboring nodes exist in only one of two sides divided by a line, which is considered to be all included in the two sides, passing through the calculating mesh nodes, the plurality of mesh nodes determine themselves to be boundary nodes, however if determined as boundary nodes, they generate at least one virtual node within the transmission area.

3. The wireless mesh network system of claim 1, wherein, when the plurality of mesh nodes, the virtual nodes, and the neighboring nodes exists on a straight line within the transmission area after having generated the at least one virtual node, the plurality of mesh nodes continue to generate the virtual node until forming at least triangle elements required for calculating the potential value, and
   the virtual node has a potential value of a predefined constant or a potential value generated by interpolating or extrapolating a potential value of the mesh node and the predefined constant.

4. The wireless mesh network system of claim 1, wherein
the plurality of mesh nodes generate virtual nodes in the vertical direction within the transmission area when the neighboring nodes are arranged to form a straight line with the mesh nodes in two facing quadrants within the transmission area, and the virtual node has a potential value of a predefined constant or a potential value generated by interpolating or extrapolating a potential value of a mesh node classified as a boundary node and the predefined constant.

5. The wireless mesh network system of claim 1, wherein
when a network prefix of a destination of a received packet corresponds to a prefix of the network of the plurality of mesh nodes, the plurality of mesh nodes route the packet by using a downlink routing method referring to a source address-based routing table including a downlink routing path determined by a uplink routing path, and when the prefixes of the network are not the same, the plurality of mesh nodes transmit the packet to a forwarding node predefined by a potential algorithm.

6. The wireless mesh network system of claim 1, wherein
the plurality of mesh nodes performs a schedule algorithm using the potential value and routing by combining uplink and downlink routing methods so as to support unicast between the mesh nodes in a domain.

7. A method for generating a virtual node, comprising:
a mesh node checking a disposed state of neighboring nodes, the mesh node as a node for calculating a potential value at a predefined specific time;

determining whether the mesh node is a boundary node based on the disposed state; and generating at least one virtual node when the mesh node is determined to be the boundary node.

8. The method of claim 7, wherein
the determining includes determining the mesh node to be a boundary node when no neighboring nodes exist in two or three consecutive quadrants in the transmission area or when the neighboring nodes exist in only one of two sides formed by dividing the transmission area by a line, which is considered to be all included in the two sides, passing through the mesh node.

9. The method of claim 7, wherein
the generating of a virtual node includes:
generating at least one virtual node within the transmission area of the mesh node;

determining whether the mesh node, the generated virtual node, and the neighboring nodes are disposed in a straight line; and, when the nodes are disposed in a straight line, the generating at least one virtual node is repeated until the mesh node, the generated virtual node, and the neighboring nodes form triangle elements required for calculating a potential value, and the virtual node has a potential value of a predefined constant or a potential value that is generated by interpolating or extrapolating a potential value of a mesh node classified as a boundary node and the predefined constant.

10. The method of claim 9, further including,
when the neighboring nodes are disposed on a straight line in two facing quadrants with the mesh node virtual nodes are generated in the vertical direction of the mesh node.

11. A method for a plurality of mesh nodes to schedule a packet in a wireless mesh network, comprising:
calculating potential values of the plurality of mesh nodes and a potential value of first-hop neighboring nodes; and scheduling a packet transmission order based on the calculated potential values, wherein the packet transmission order is based on force determined by a difference between the potential values of the plurality of mesh nodes and the potential values of the first-hop neighboring nodes.

12. The method of claim 11, wherein
the scheduling further includes:
the plurality of mesh nodes respectively updating the potential values of the plurality of mesh nodes and the potential values of the first-hop neighboring nodes to a central processor for controlling the wireless mesh network; and receiving a packet transmission order from the central processor, wherein the packet transmission order includes a channel access order for sequentially allocating time slots starting from the transmission path with the greatest force defined by a difference between the potential values of the plurality of mesh nodes and the potential values of the first-hop neighboring nodes.

13. The method of claim 11, wherein
the scheduling includes:
calculating force defined by a difference between the potential values of the plurality of mesh nodes and the potential values of the first-hop neighboring nodes;

setting a priority based on the intensity of force; and determining a transmission standby time and a contention standby time in a medium access contention method according to the priority.

\* \* \* \* \*